United States Patent
Wolk

Patent Number: 5,425,882
Date of Patent: Jun. 20, 1995

[54] APPARATUS FOR REMOVING DIRT PARTICLES FROM WATER

[75] Inventor: Reinhard Wolk, Hamburg, Germany

[73] Assignee: Boco GmbH & Co., Hamburg, Germany

[21] Appl. No.: 952,631

[22] PCT Filed: Mar. 24, 1992

[86] PCT No.: PCT/EP92/00639

§ 371 Date: Nov. 20, 1992

§ 102(e) Date: Nov. 20, 1992

[87] PCT Pub. No.: WO92/19356

PCT Pub. Date: Nov. 12, 1992

[30] Foreign Application Priority Data

May 3, 1991 [DE] Germany ............... 9105485 U
Dec. 12, 1991 [DE] Germany ............... 41 40 892.6

[51] Int. Cl.$^6$ ............... B01D 25/00; B01D 29/07; B01D 29/44; B01D 39/08

[52] U.S. Cl. ............... 210/749; 210/767; 210/804; 210/806; 210/295; 210/316; 210/406; 210/446; 210/482; 210/488; 210/493.1; 210/507; 68/12.13

[58] Field of Search ............... 210/507, 295, 482, 499, 210/316, 446, 474, 475, 476, 488, 494.1, 406, 749, 767, 804, 806, 493.1; 68/12.13, 18 F

[56] References Cited

U.S. PATENT DOCUMENTS

| | | | |
|---|---|---|---|
| 1,028,377 | 6/1912 | Montanye | 210/295 |
| 1,197,403 | 9/1916 | Seavy | 210/507 |
| 2,413,954 | 1/1947 | Conterman . | |
| 2,934,209 | 4/1960 | Franck | 210/316 |
| 2,995,254 | 8/1961 | Bennett | 210/507 |
| 3,132,099 | 5/1964 | Eilhauer | 210/507 |
| 3,502,116 | 3/1970 | Crawford | 210/499 |
| 3,539,049 | 11/1970 | D'Eustachio | 210/482 |
| 3,638,799 | 2/1972 | Serowiecki | 210/474 |
| 3,696,033 | 10/1972 | De Fano | 210/482 |
| 3,727,435 | 4/1973 | Menk | 210/356 |
| 3,762,562 | 10/1973 | Okuniewski | 210/460 |
| 3,804,258 | 4/1974 | Okuniewski | 210/460 |
| 3,959,138 | 5/1976 | Nichols | 210/460 |
| 3,960,733 | 6/1976 | Van Dieren | 210/460 |
| 3,984,330 | 10/1976 | Nichols | 210/460 |
| 4,126,499 | 11/1978 | Payen | 210/507 |
| 4,217,667 | 8/1980 | Whitehouse | 210/482 |
| 4,289,627 | 9/1981 | Disselbeck | 210/507 |
| 4,566,970 | 1/1986 | Piai | 210/460 |
| 4,906,367 | 3/1990 | Villagomez | 210/499 |
| 5,100,540 | 3/1992 | Ramirez | 210/295 |

FOREIGN PATENT DOCUMENTS

| | | |
|---|---|---|
| 0009141 | 4/1980 | European Pat. Off. . |
| 99144 | 7/1982 | European Pat. Off. . |
| 313 | 3/1952 | German Dem. Rep. . |
| 398055 | 9/1933 | United Kingdom . |
| 775310 | 8/1954 | United Kingdom . |
| 2089780 | 6/1982 | U.S.S.R. . |
| 1473805 | 4/1989 | U.S.S.R. . |

OTHER PUBLICATIONS

Kruger, R., "Die Filter" 1886, Kapitel V,, "Die Gewebefilter und die Filterpressen" Hartleben's Verlag.

Kufferath, A., "Filtration und Filter", 1952.

*Primary Examiner*—Thomas M. Lithgow
*Attorney, Agent, or Firm*—Abelman, Frayne & Schwab

[57] ABSTRACT

The invention relates to an apparatus for removing dirt particles (with and without oil deposition) from water or from waste water without free oil, in particular waste water which occurs in commercial laundries after the washing of garments, work clothes and the like. It includes a closeable tank (10) which has an inflow opening (11) and at the bottom a sieve drain (12, 13), and in the interior above the drain a layer of textiles is provided which contains in particular used garments as filter.

4 Claims, 2 Drawing Sheets

APPARATUS FOR REMOVING DIRT PARTICLES FROM WATER

BACKGROUND OF THE INVENTION

The invention relates to an apparatus for removing dirt particles (with and without oil depositions) from water or from waste water without free oil, in particular waste water which occurs in commercial laundries after the washing of garments, work clothes and the like.

FIELD OF THE INVENTION

Waste water which occurs in commercial laundries involves the problem of treatment, the objective being to treat the water to the extent that it can be discharged into the public sewer system in compliance with the applicable governmental regulations.

DESCRIPTION OF THE RELATED ART

A number of methods are known which can be employed in this connection, to mention only a few, they are electroflotation, evaporation, flocculation, ultrafiltration, and the like. In each of these methods, there are essentially three disadvantages which manifest themselves. They require the use of additional chemicals, so that after the chemicals have been employed, a specialized waste product must be disposed of. The utilization of energy, whether for heating, warming or stirring, results in increased additional costs of water treatment. And lastly, the high cost of instrumentation, which for certain methods is exceedingly high.

SUMMARY OF THE INVENTION

In connection with the treatment of waste water, the present invention deals specifically with the problem of removing the solids and dirt particles from the waste water in such a manner that only a small proportion of special waste is obtained, which moreover can be transported or burned without a problem.

This is achieved with the aid of the apparatus of the present invention and the respective method, which will be described hereinafter.

An essential feature of the present invention must be seen in that the textiles present inside the apparatus according to the invention are oriented essentially so that the warp and woof threads of the textiles extend in the flow direction of the water, rather than being arranged transversely, as would be done in the case of a sieve. In principle, therefore, the present invention involves a trickle filter where textile material is charged in a special orientation.

The possibility exits of increasing the flow of the waste water through the tank of the apparatus of the present invention by applying pressure, although allowing the waste water to run through without additional pressure is the best procedure from the viewpoint of energy conservation. Tests have shown that the removal of the waste water by applying suction from below, under elevated pressure, gives better results than pressurizing from the inlet side.

Of special importance for the present invention is the provision of a barrier in the drain zone, to prevent the water from getting to the drain along the wall of the tank.

Tests in connection with the present invention have further demonstrated that heavy metal can be at least partially removed from the waste water by means of the apparatus according to the invention.

BRIEF DESCRIPTION OF THE DRAWINGS

The invention will be explained below by way of an example with reference to the drawing.

Figure 1:
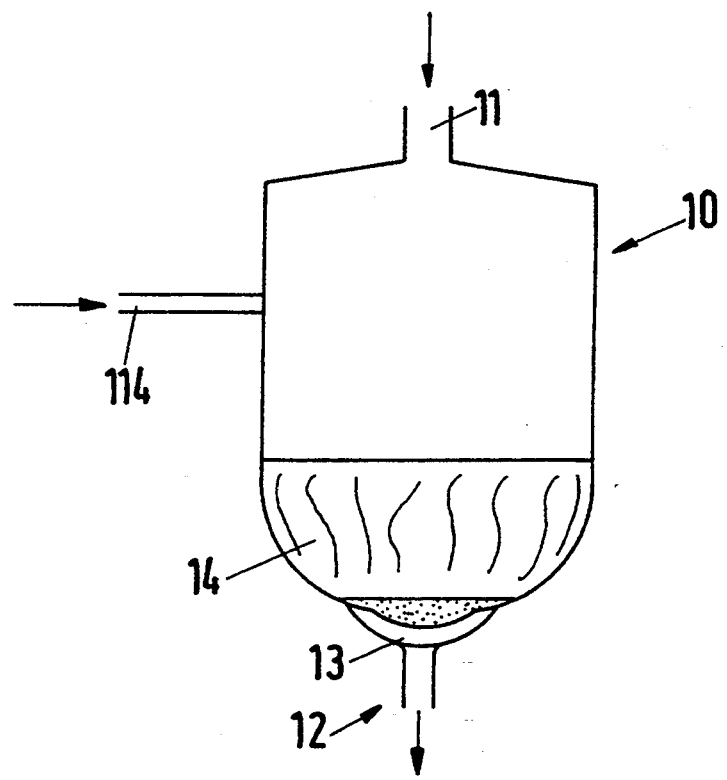
FIG. 1 shows a perspective view of an apparatus according to the invention.

DESCRIPTION OF THE PREFERRED EMBODIMENT 10 denotes a tank which an be used in connection with the present invention. The tank has an inlet opening 11, through which the waste water can be introduced. The inlet opening 11 can be closed tightly. In the lower region of tank 10 there is a drain sieve 13, so that through a drain line 12 purified water, which is substantially clean, although it may have a yellowish color, can run off.

14 denotes a layer of filling of textiles in the form of garments, which are loosely folded and form a kind of filter. Essential in this connection is that the textiles form a relatively large surface, on which the soiled water can run off or trickle down. Significant, however, is that on the upper surface the dirt particles collect in the manner of a cake and can later be removed from tank 10, as will be explained later on.

114 denotes a steam or compressed air feed line.

According to the invention, one proceeds as follows:

After the layer 14 of garments has been introduced into tank 10, waste water is let in from above via line 11. Previously this waste water has passed through an acidification stage, so that it has a pH value in the range of 3 to 4. In addition, free oil has been removed from this waste water by any one of the various methods which are well-known in the art.

The tank 10 is closed, and the waste water is given the opportunity to trickle along the textile pieces 14 and to pass via sieve 13 into line 12 to the outside. As has been mentioned, the water running off is clear, although it may have, for example, a slightly yellowish color.

In the course of time, the solid particles collect, which consist essentially of the actual dirt particles that contaminate the water, but also of detergent particles, which in fact have removed the dirt particles from the garment to be cleaned.

After a certain period of time, either compressed air or steam can be introduced into tank 10. An increase of the flow velocity of the residual water is thereby achieved.

The textiles can be used repeatedly, but even if they can be used only once or a few times, the method according to the invention is more economical and advantageous for the reason that it involves material which has already been mustered out anyway and is no longer needed. What is being used as a filter material in this instance is a material which can already be regarded as scrap or waste material.

Figure 2:
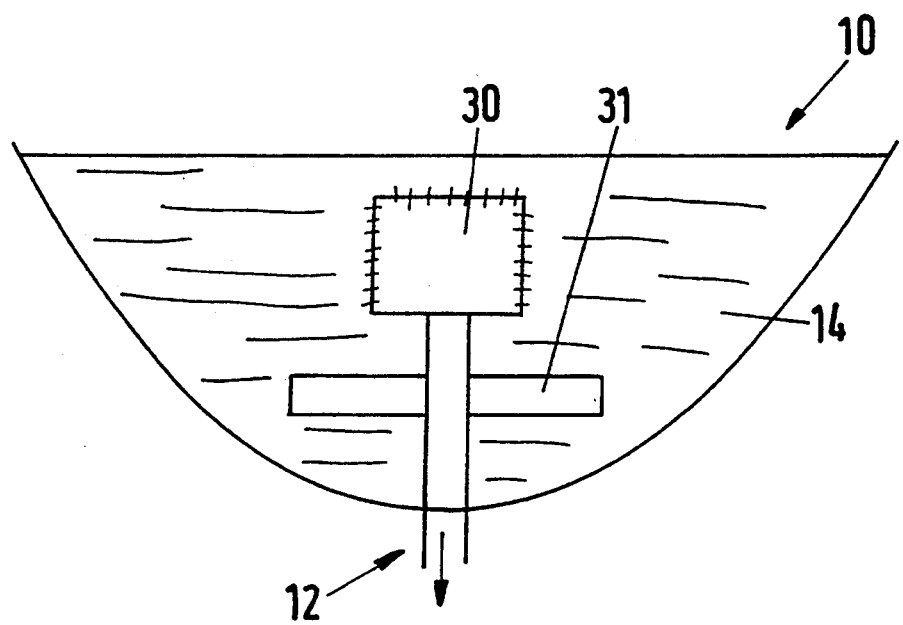
FIG. 2 shows details of the drain zone of another apparatus than shown in FIG. 1, on a larger scale, in transverse section.

FIG. 2 shows details in the region of the outlet 12. In fact, if the drain line were located in the bottom part of the tank 10, the more or less purified waste water could move along the wall of tank 10 toward the outflow opening 12. To prevent this from occurring, a pipe is provided above the outlet and thereabove a kind of cylinder 30 is provided which has openings on its wall and on the upwardly directed end face. These are the exit points for the water, i.e., not in the lower region of tank 10 but above.

In order further to prevent direct passage, there is located below the cylindrical outflow member a barrier member 31, which may have, for example, a rubberized surface.

What is claimed is:

1. Apparatus for removing oil-free or oil-containing dirt particles from the waste water emanating from a commercial laundry subsequent to the garment washing operation and providing relatively purified waste water, which comprises:

(a) a closeable tank (10) which has an inlet opening (11) at the top thereof through which waste water from the garment washing operation is introduced and a drain line outlet (12) at the bottom of the tank (10) through which relatively purified waste water exists the tank (10), said inlet opening (11) and said drain line outlet (12) defining a substantially linear flow direction from said inlet opening (11) to said drain line outlet (12);

(b) a filter (14) comprising a plurality of textile pieces located in the lower region of the tank (10), said textile pieces being oriented so that the warp and woof threads extend in the flow direction of the waste water whereby the dirt particles collect on the filter and the waste water trickles through the filter;

(c) a drain sieve (13) located beneath the filter and covers the drain line outlet (12) which traps those dirt particles which may have eluded the filter; and (d) inlet means (114) disposed in the side of the tank (10) above the level of the filter (14) for introducing compressed air or steam into said waste water in the tank (10) to increase the flow velocity of the waste water.

2. A method of purifying waste water issuing from the washing operation of a commercial laundry, by removing dirt particles from the waste water, which is free of oil, which comprises the steps of:

(a) providing a closable tank (10) which has an inlet opening (11) at the top thereof through which waste water from said commercial laundry is introduced and a drain line outlet (12) at the bottom of the tank (10) through which relatively purified waste water exists the tank (10), said inlet opening (11) and the drain line outlet (12) defining a substantially linear flow direction from said inlet opening (11) directly to said drain line outlet (12);

further providing a filter (14) comprising a plurality of textile pieces located in the lower region of the tank (10), said textile pieces being oriented so that a plurality of the warp and woof threads extend in the flow direction of the waste water whereby the dirt particles collect on the filter and waste water trickles through the filter;

further providing a drain sieve (13) located beneath the filter and covers the drain line outlet (12) which traps those dirt particles which may have eluded the filter;

further providing inlet means (114) disposed in the side of the tank (10) above the level of the filter (14) for introducing compressed air or stream into said waste water in the tank (10) to increase the flow velocity of the waste water;

passing the waste water through said inlet opening at the top of an enclosed tank introducing air of stream into said tank and allowing the waste water to trickle through the filter formed of a layer of textiles wherein the warp and woof threads of the textiles extend in the flow direction of the waste water;

(b) thereafter passing the waste water through the sieve; and (c) allowing the now relatively purified waste water to pass through the drain line outlet (12) at the bottom of the enclosed tank and to exit therefrom.

3. A method according to claim 2 and including the step of acidifying the waste water prior to its being introduced into the enclosed tank.

4. A method according to claim 3, wherein the pH of the waste water after acidification is between about 3 and 4.

* * * * *